Patented June 8, 1937

2,083,122

UNITED STATES PATENT OFFICE 2,083,122

MANUFACTURE OF ARTIFICIAL FILAMENTS, THREADS, FILMS, AND THE LIKE

Henry Charles Olpin and George Holland Ellis, Spondon, near Derby, England, assignors to Celanese Corporation of America, a corporation of Delaware No Drawing. Application June 27, 1933, Serial No. 677,850. In Great Britain July 19, 1932

14 Claims. (Cl. 18—54)

This invention relates to the production or treatment of textile materials and particularly to processes whereby fast colourations may be obtained upon them.

In the dyeing or otherwise colouring of textile materials a great difficulty has been that the colourations upon such materials have been liable to fade under acidic conditions, and numerous attempts have been made to overcome this disadvantage. Thus inorganic and organic compounds of an alkaline or basic character, e. g. sodium carbonate, borax, urea, thiourea and guanidines, have been incorporated in the materials with the object of preventing fading, as is described in U. S. Patents Nos. 1,985,248 and 1,972,111. Again, amino or substituted amino compounds, e. g. aniline, alkylated anilines and alkylated phenylene diamines have been employed as described in U. S. Patent No. 1,723,230, whilst U. S. Patents Nos. 1,930,232, 1,957,493 and 2,008,902 describe the use of alkylated amino diaryl bases, aralkylated aromatic amines and mono-acidyl derivatives of aliphatic diamines.

We have now discovered that the liability to acid fading of colourations produced upon textile materials, and particularly of colourations produced by anthraquinone derivatives, e. g. those containing free amino or alkyl amino groups, may be reduced by the presence in the textile materials of organic derivatives of cellulose which themselves contain basic groupings, for example amino or substituted amino groups.

The production of cellulose derivatives containing amino or substituted amino groups is described in various specifications of Dr. Henry Dreyfus. Thus, U. S. Patent No. 1,930,471 describes processes in which halogen-containing cellulose ethers are treated with ammonia or with aliphatic, aromatic or other organic amines to form amino-ethers of cellulose, and in U. S. Patent No. 2,015,104 the production of cellulose esters or ethers containing a nitrile radicle is described, from which amino substituted cellulose derivatives may be obtained by reduction of the nitrile grouping. Again, the manufacture of nitrogen-containing cellulose derivatives by treating carboxy or hydroxy esters or ethers of cellulose so as to substitute amino or substituted amino groups for the hydroxy groups is described in U. S. Patent No. 2,007,950, while the production of cellulose derivatives containing aminoaralkyl groups, and the treatment of halogen-containing cellulose derivatives with ammonia or organic amines in order to produce cellulose derivatives containing amino groups are described in U. S. Patent No. 1,947,464. U. S. application S. No. 647,433 filed 15th December, 1932 also describes the production of nitrogen-containing cellulose derivatives, by reacting on unsaturated cellulose derivatives with organic bases. It is not of course necessary that all the hydroxy groups of the cellulose nucleus should be esterified or etherified by radicles carrying an amino group, and mixed esters or ethers or ether-esters may be produced which contain both amino substituted ether or ester radicles and other ether or ester radicles for example ethyl or acetyl radicles. The said cellulose derivatives containing amino or substituted amino groups are insoluble in aqueous alkali.

According to the present invention therefore, textile materials having an improved resistance to acid fading, and particularly to the acid fading of colourations produced by anthraquinone derivatives, e. g. those containing free amino or alkyl amino groups, are obtained by incorporating in the materials a small proportion of amino groups, which term is to be understood to include not only free amino groups, e. g. attached to the hydrocarbon radicles or in acid amide groups, but also amino groups in which the hydrogen has been substituted by one or more organic radicles in the form of amino substituted cellulose derivatives. Examples of nitrogen-containing compounds from which the amino substituted cellulose derivatives may be obtained are mono-, di- and tri-ethylamine, pyridine and dimethylaniline. The process of the present invention is applicable both to natural and also to artificial textile materials, but the method of its application in the case of artificial materials obtained from organic derivatives of cellulose will in general be different from that in the case of natural textile materials, e. g. wool and natural silk, or of other artificial textile materials.

In the case of materials having a basis of an organic derivative of cellulose the amino groups are preferably introduced by way of the spinning solution from which the artificial materials are formed. Thus a mixed cellulose derivative, obtained by substituting some of the hydroxyl groups of the cellulose nucleus by ester or ether groupings containing amino groups and other nuclear hydroxyl groups by ester or ether radicles which do not contain amino groups, may be dissolved in a suitable solvent to form a spinning solution which is then extruded through spinning orifices, the resulting materials being set according to wet or dry spinning processes. Alternatively, a spinning solution may be made up containing an amino substituted cellulose derivative whether it be a mixed cellulose derivative such as is referred to above or one in which all the ester and/or ether radicles contain amino groups, and also a cellulose derivative which does not contain amino groups, and this solution may be spun in any suitable manner. In either case artificial materials will be obtained which contain a small proportion of amino groups, and which have an improved resistance to acid fading. The proportion of amino groups in the artificial materials may of course vary within wide limits. Preferably however, the proportion used is not sufficient substantially to affect other dyeing properties of the material, and in general it has been found that a proportion corresponding to a nitrogen content of from .1 to 3 or even 5% on the weight of the artificial material yields satisfactory results.

Artificial materials having a basis of organic derivatives of cellulose and containing amino groups may also be obtained according to the present invention by treating the formed materials with solutions containing amino substituted cellulose derivatives, but in this case it is of course necessary that the solvent employed for the amino substituted cellulose derivative should not have any pronounced solvent or other deleterious action on the cellulose derivative forming the base of the artificial materials.

In the case of natural textile materials or of other artificial materials, filaments, threads, yarns, fabrics and the like may be impregnated with a solution in a suitable solvent of an organic derivative of cellulose containing amino groups, for example any of the amino substituted cellulose derivatives described in the above specifications of Dr. Henry Dreyfus. The impregnating solution may contain an organic derivative of cellulose, all of the ester and/or ether radicles of which contain amino groupings, or a mixed derivative containing both amino substituted radicles and other radicles, or it may contain both of the above types of cellulose derivatives or mixtures of either or both of these with cellulose derivatives containing no amino substituted radicles. Any suitable solvent for the cellulose derivative may be employed, provided that it has no marked deleterious action upon the textile material to be treated, and wetting or swelling agents, or other substances which assist in the process, for example, which improve the impregnation, may, if desired, be present in the solution.

The proportion of organic derivative of cellulose actually incorporated in textile materials will depend upon various factors, for example, the type of material, the concentration of the solution and the length of time during which it is in contact with the materials. The proportion of organic derivatives of cellulose which it is desired to incorporate will of course depend largely upon their content of amino groups, for example whether all the ether and/or ester radicles of the cellulose derivative contain amino groups, or whether a solution containing a mixture of the amino substituted cellulose derivatives and other cellulose esters or ethers is employed, but in general the incorporation of a content of amino groups similar to that specified above has been found to yield products having a very satisfactory fastness to acid fading.

While the impregnation of formed materials with the amino substituted cellulose derivatives is preferably carried out by passing the materials through or immersing them in solutions of such derivatives, yet the invention is not limited to this method of operation and may be carried out in any other suitable manner, for example, by spraying, or by contacting the materials with wicks, rollers and the like which are impregnated with a solution of the cellulose derivative. Further, the process may be carried out on the materials during their passage from one support to another, as. for example, during a bobbin to bobbin operation, or, in the case of artificial materials, continuously with their production by wet or dry spinning processes, or upon filaments or the like in the form of hanks, cheeses or wound on pirns or other supports, or upon fabrics.

The process of the present invention is of particular value in connection with the production or treatment of artificial materials containing cellulose acetate or other organic derivatives of cellulose, such as cellulose esters or mixed esters, for example cellulose formate, propionate, butyrate and nitroacetate, ethyl, butyl, benzyl and other cellulose ethers, and mixed ether-esters, for example ethyl cellulose acetate and oxy-ethyl cellulose acetate, but, as stated above, it may also be employed in connection with other artificial materials, and with natural textile materials e. g. wool and natural silk.

The following examples are given in order to illustrate the invention but it is to be clearly understood that they do not limit it in any way:—

*Example 1*

A spinning solution containing a mixture of cellulose acetate and of the nitrogen-containing cellulose derivative obtained by the action of diethylamine on cellulose chloracetate is spun into an evaporative atmosphere through jets having orifices of about .08 mm. The proportions of the cellulose derivatives in the spinning solution are such that the nitrogen content is about .2% based on the total cellulose derivative present. The artificial yarns obtained may be dyed with 1-amino-4-methyl-amino-anthraquinone by the usual methods, the blue-violet shade thus obtained being faster to the combined action of light and the products of the combustion of coal gas than is a similar shade on an ordinary cellulose acetate fabric. The nitrogen-containing cellulose derivative employed in this example may be prepared by boiling 100 parts of cellulose chloracetate for 1–3 hours with a solution of 200 parts of diethylamine in 600 parts of absolute alcohol, separating and washing the product.

*Example 2*

Cellulose acetate and the nitrogen-containing product obtained by treating cellulose glycollic acid with thionyl chloride and subsequently with ammonia are dissolved in acetone to form a spinning solution containing about 1% of nitrogen based on the total weight of the cellulose derivative present and spun through suitable orifices into an evaporative atmosphere. The materials obtained may be dyed a blue shade with 1:4-dimethyl-amino-anthraquinone from a suspension of the finely divided dyestuff in a soft water bath containing Turkey red oil. The colour shows a greater resistance to the combined action of light and the products of combustion of coal gas than does an equal shade on normal cellulose acetate materials. The nitrogen-containing cellulose derivative employed in this example may be prepared by the following method. Cellulose glycollic acid is dissolved or suspended in about 10 times its weight of benzene and treated with about 1¼ times its own weight of thionyl chloride in the case of an ether containing 2½-3 ether groups or a correspondingly smaller quantity of lower ether. The mixture is at first gently warmed and maintained at a temperature of 25-35° C. After 20-30 minutes the excess of thionyl chloride and the benzene are removed under vacuum and the cellulose derivative washed continuously with ligroin. The chlorinated product is then heated in a closed container with excess of concentrated ammonia solution at a temperature of 100-110° C.

What we claim and desire to secure by Letters Patent is:—

1. Process for the manufacture of filaments, threads, yarns, ribbons and the like having a basis of organic derivatives of cellulose capable of being colored with improved fastness with coloring materials normally liable to fade under acidic conditions, which comprises forming the materials from solutions containing in solution cellulose acetate, and organic derivatives of cellulose which contain amino groups in substituent radicles and are insoluble in aqueous alkali, the proportion of amino derivative being such that the nitrogen content of the solutions in the form of amino groups does not exceed 0.2% of the weight of the cellulose derivatives in the solutions.

2. Artificial filaments, threads, yarns, fabrics and the like having a basis of cellulose acetate, and containing organic derivatives of cellulose which are insoluble in aqueous alkali and which contain amino groups in substituent radicles in such proportions that the nitrogen content of the materials in the form of amino groups does not exceed 1% of the weight of the materials.

3. Filaments, threads, yarns, ribbons, fabrics and like materials according to claim 2, wherein the organic derivative of cellulose containing amino groups in substituent radicles is free from nitrogen other than that present in such amino groups.

4. Artificial filaments, threads, yarns, fabrics and the like having a basis of cellulose acetate and dyed with an anthraquinone dyestuff, said artificial filaments, threads, yarns, fabrics and the like containing organic derivatives of cellulose which are insoluble in aqueous alkali and which contain amino groups in substituent radicles in such proportions that the nitrogen content of the materials in the form of such amino groups is between 0.1 and 0.2% of the weight of the materials.

5. In the manufacture of filaments, threads, yarns, ribbons, fabrics and the like capable of being colored with improved fastness with coloring materials normally liable to fade under acidic conditions, the step of incorporating in the materials sulphur-free organic derivatives of cellulose which contain amino groups in substituent radicles, the proportion of such organic derivative of cellulose being such that the nitrogen content of the materials in the form of amino groups does not exceed 5% of the weight of the materials.

6. In the manufacture of filaments, threads, yarns, ribbons and the like capable of being colored with improved fastness with coloring materials normally liable to fade under acidic conditions, the step of impregnating the formed materials with sulphur-free organic derivatives of cellulose which contain amino groups in substituent radicles, the proportion of such organic derivatives of cellulose in the impregnated materials being such that the nitrogen content of the materials in the form of amino groups does not exceed 1% of the weight of the materials.

7. Process for the manufacture of filaments, threads, yarns, ribbons and the like having a basis of organic derivatives of cellulose and capable of being colored with improved fastness with coloring materials normally liable to fade under acidic conditions, which comprises forming the materials from solutions containing organic derivatives of cellulose which are free from amino groups and sulphur-free organic derivatives of cellulose which contain amino groups in substituent radicles, the proportion of amino derivative being such that the nitrogen content of the solutions in the form of amino groups does not exceed 1% on the weight of the cellulose derivatives in the solutions.

8. Filaments, threads, yarns, ribbons, fabrics and like materials containing sulphur-free organic derivatives of cellulose which contain amino groups in substituent radicles in such proportions that the nitrogen content of the materials in the form of amino groups does not exceed 5% of the weight of the materials.

9. Artificial filaments, threads, yarns, ribbons, fabrics and like materials comprising organic derivatives of cellulose which are free from nitrogen and sulphur-free organic derivatives of cellulose which contain amino groups in substituent radicles, the nitrogen content of the materials in the form of amino groups being not in excess of 1% of the weight of the materials.

10. In a process for the manufacture of filaments, threads, yarns, ribbons, fabrics and the like having a basis of organic derivatives of cellulose and capable of being colored with improved fastness with coloring materials normally liable to fade under acidic conditions, the step of incorporating in the materials sulphur-free organic derivatives of cellulose which contain amino groups in substituent radicles, the proportion of such organic derivative of cellulose being such that the nitrogen content of the materials in the form of amino groups does not exceed 1% of the weight of the materials.

11. In the manufacture of filaments, threads, yarns, ribbons and the like capable of being colored with improved fastness with coloring materials normally liable to fade under acidic conditions, the step of impregnating the formed materials with sulphur-free organic derivatives of cellulose which contain amino groups in substituent radicles, the proportion of such organic derivatives of cellulose in the impregnated materials being such that the nitrogen content of the materials in the form of amino groups does not exceed 5% of the weight of the materials.

12. Process for the manufacture of filaments, threads, yarns, ribbons and the like having a basis of cellulose acetate and capable of being colored with improved fastness with coloring materials normally liable to fade under acidic conditions, which comprises forming the materials from solutions containing cellulose acetate and sulphur-free organic derivatives of cellulose which contain amino groups in substituent radicles, the proportion of amino derivative being such that the nitrogen content of the solutions in the form of amino groups does not exceed 1% on the weight of the cellulose derivatives in the solutions.

13. In the manufacture of filaments, threads, yarns, ribbons and the like having a basis of organic derivatives of cellulose and capable of being colored with improved fastness with coloring materials normally liable to fade under acidic conditions, the step of impregnating the formed materials with sulphur-free organic derivatives of cellulose which contain amino groups in substituent radicles, the proportion of such organic derivatives of cellulose in the impregnated materials being such that the nitrogen content of the materials in the form of amino groups does not exceed 1% of the weight of the materials.

14. Artificial filaments, threads, yarns, ribbons, fabrics and like materials comprising cellulose acetate and sulphur-free organic derivatives of cellulose which contain amino groups in substituent radicles, the nitrogen content of the materials in the form of amino groups being not in excess of 1% of the weight of the materials.

HENRY CHARLES OLPIN.
GEORGE HOLLAND ELLIS.